United States Patent
Yano

(10) Patent No.: US 8,958,692 B2
(45) Date of Patent: Feb. 17, 2015

(54) OPTICAL FIBER TRANSMISSION SYSTEM AND POWER CONTROL METHOD OF THE SAME

(75) Inventor: Yutaka Yano, Tokyo (JP)

(73) Assignee: NEC Corporation, Tokyo (JP)

( * ) Notice: Subject to any disclaimer, the term of this patent is extended or adjusted under 35 U.S.C. 154(b) by 300 days.

(21) Appl. No.: 13/411,194

(22) Filed: Mar. 2, 2012

(65) Prior Publication Data
US 2012/0224848 A1    Sep. 6, 2012

(30) Foreign Application Priority Data
Mar. 4, 2011    (JP) .................. 2011-048051

(51) Int. Cl.
 *H04B 10/08* (2006.01)
 *H04B 10/079* (2013.01)
(52) U.S. Cl.
 CPC .................. *H04B 10/0793* (2013.01)
 USPC .......... 398/38; 398/33; 398/30; 398/13; 398/15; 398/37; 398/177; 398/181; 359/341; 359/337; 359/341.2; 359/334
(58) Field of Classification Search
 USPC ........... 398/177, 181, 33, 38, 37, 13, 15, 30, 398/31, 34, 20, 17, 32; 359/341, 337, 359/341.2, 341.41, 334
 See application file for complete search history.

(56) References Cited

U.S. PATENT DOCUMENTS

| | | | |
|---|---|---|---|
| 6,359,708 B1 * | 3/2002 | Goel et al. ................. | 398/15 |
| 6,504,630 B1 * | 1/2003 | Czarnocha et al. ......... | 398/15 |
| 7,260,324 B2 | 8/2007 | Passier et al. | |
| 7,957,643 B2 * | 6/2011 | Feldman et al. ............ | 398/30 |

* cited by examiner

*Primary Examiner* — Hanh Phan
(74) *Attorney, Agent, or Firm* — Sughrue Mion, PLLC

(57) ABSTRACT

An optical transmission system includes a first node and a second node, the first node includes a first optical amplifier which outputs a signal to the second node through a first transmission line and a first monitoring unit, the second node includes a monitor which monitors a signal from the first transmission line, a second optical amplifier which outputs a signal to the first node through a second transmission line and a second monitoring unit, upon detecting disconnection from the first transmission line, the second monitoring unit transmits a notification for making power of the first optical amplifier reduced, upon receipt of the notification, the first monitoring unit reduces power of the first optical amplifier, and transmits a completion notification to the second monitoring unit, and upon not receiving the completion notification even after expiration of an allowed time, the second monitoring unit reduces power of the second optical amplifier.

7 Claims, 7 Drawing Sheets

OSC: OPTICAL SUPERVISORY CHANNEL
T: TRANSMITTER
R: RECEIVER OR POWER MONITOR

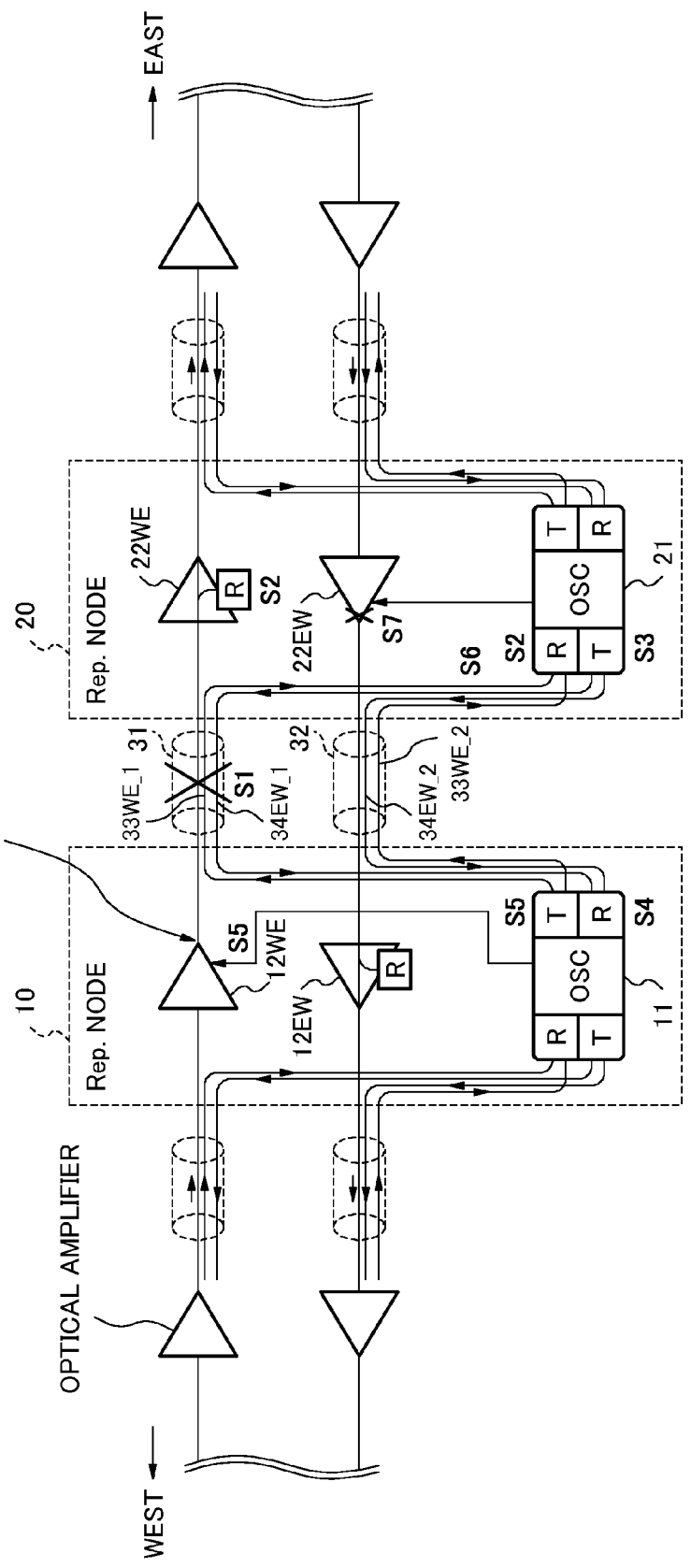

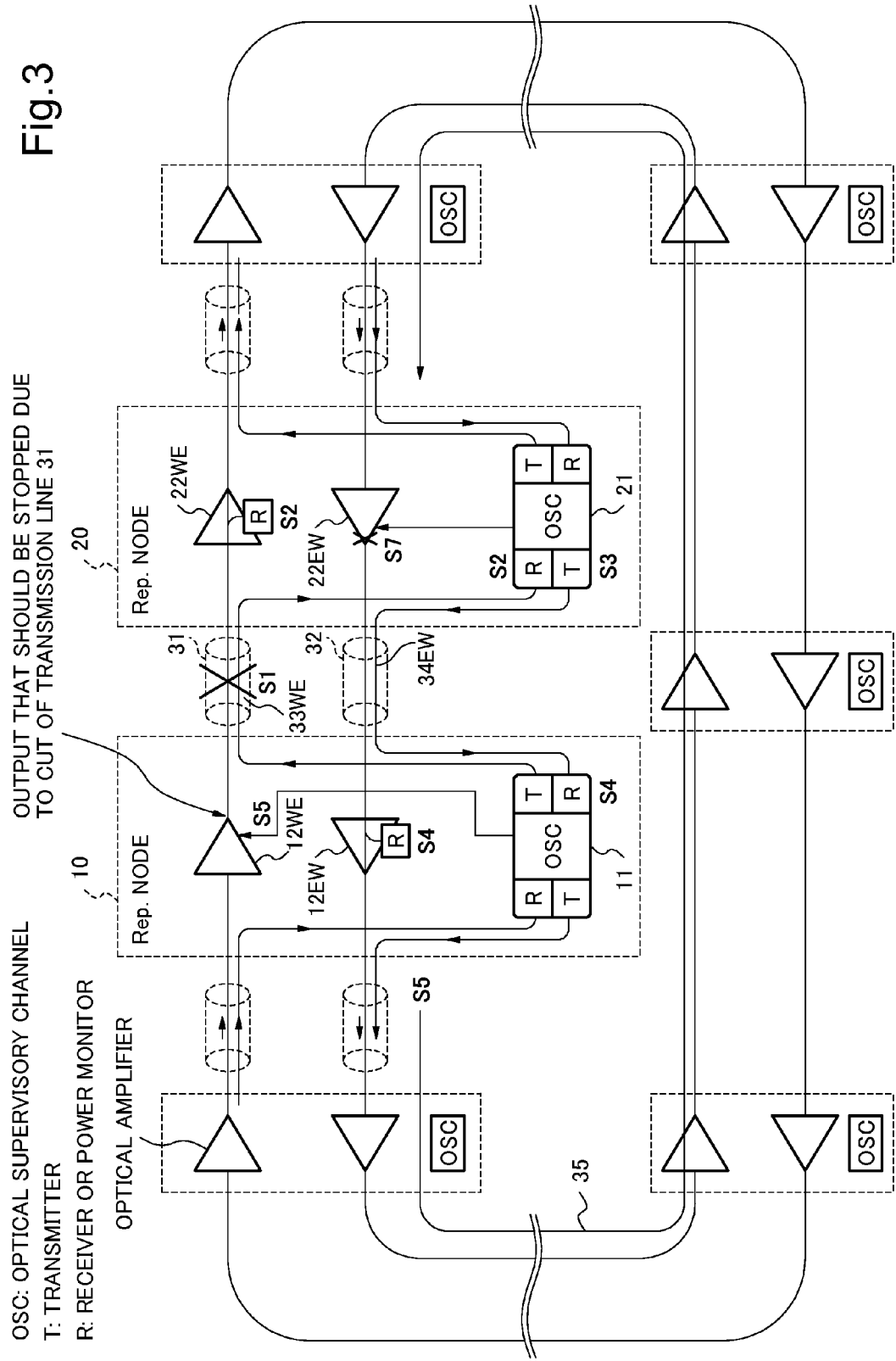

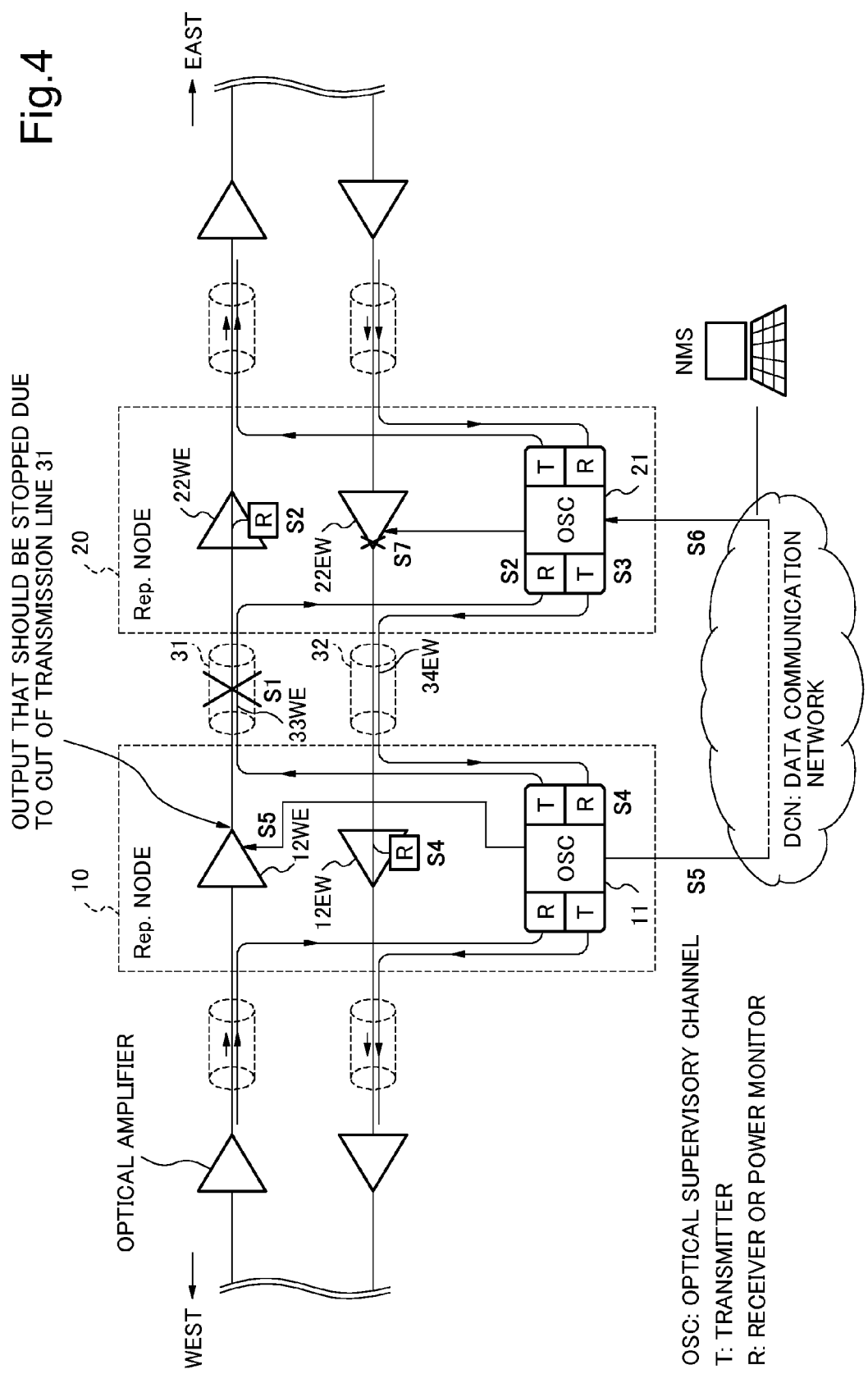

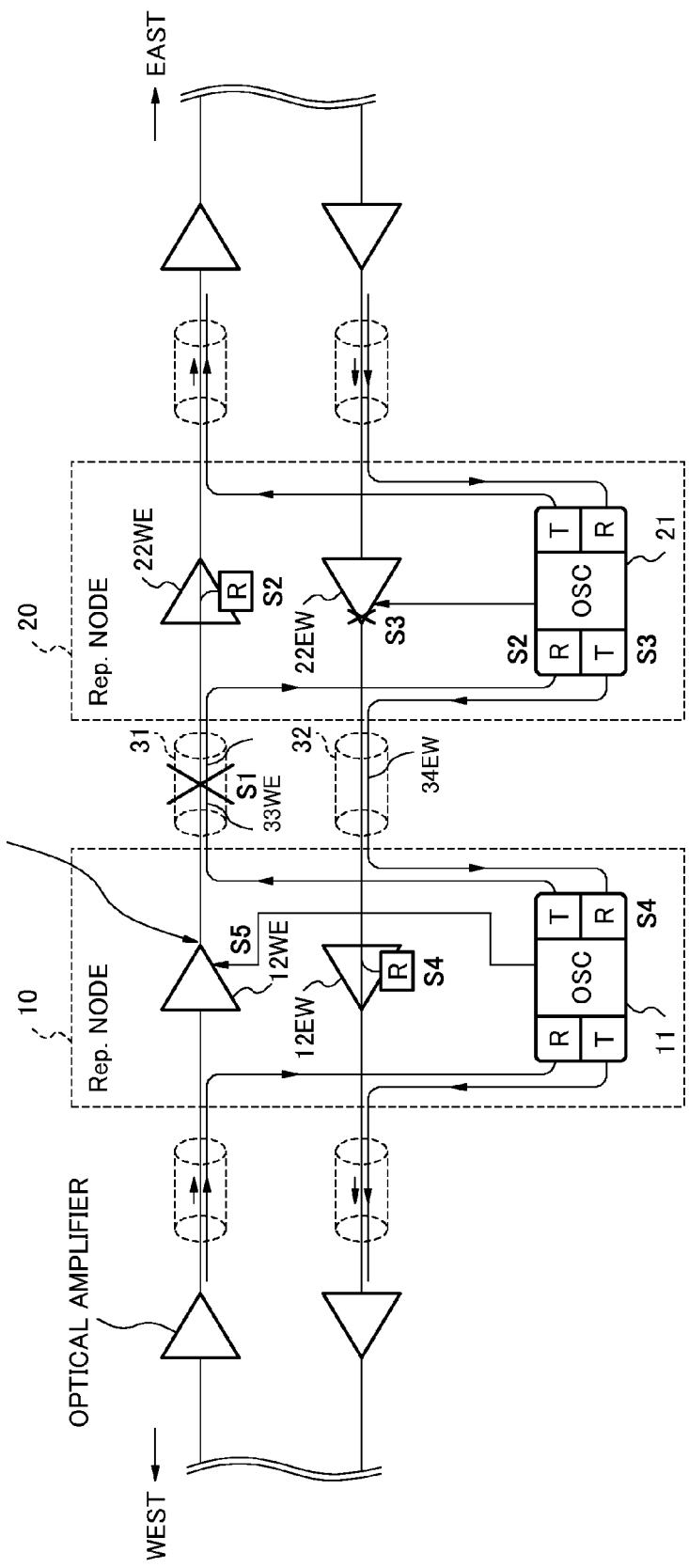

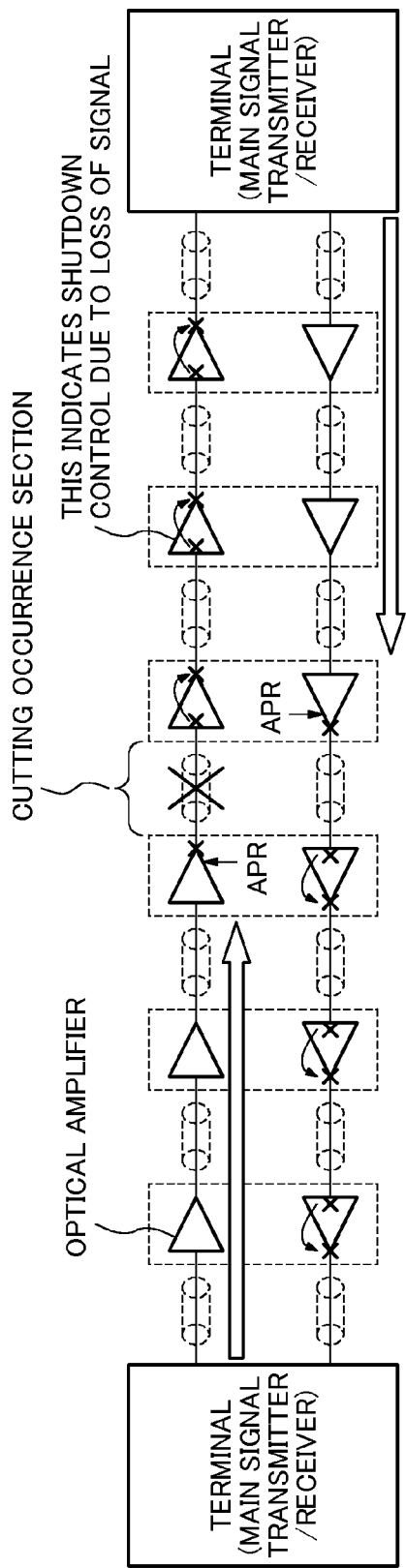

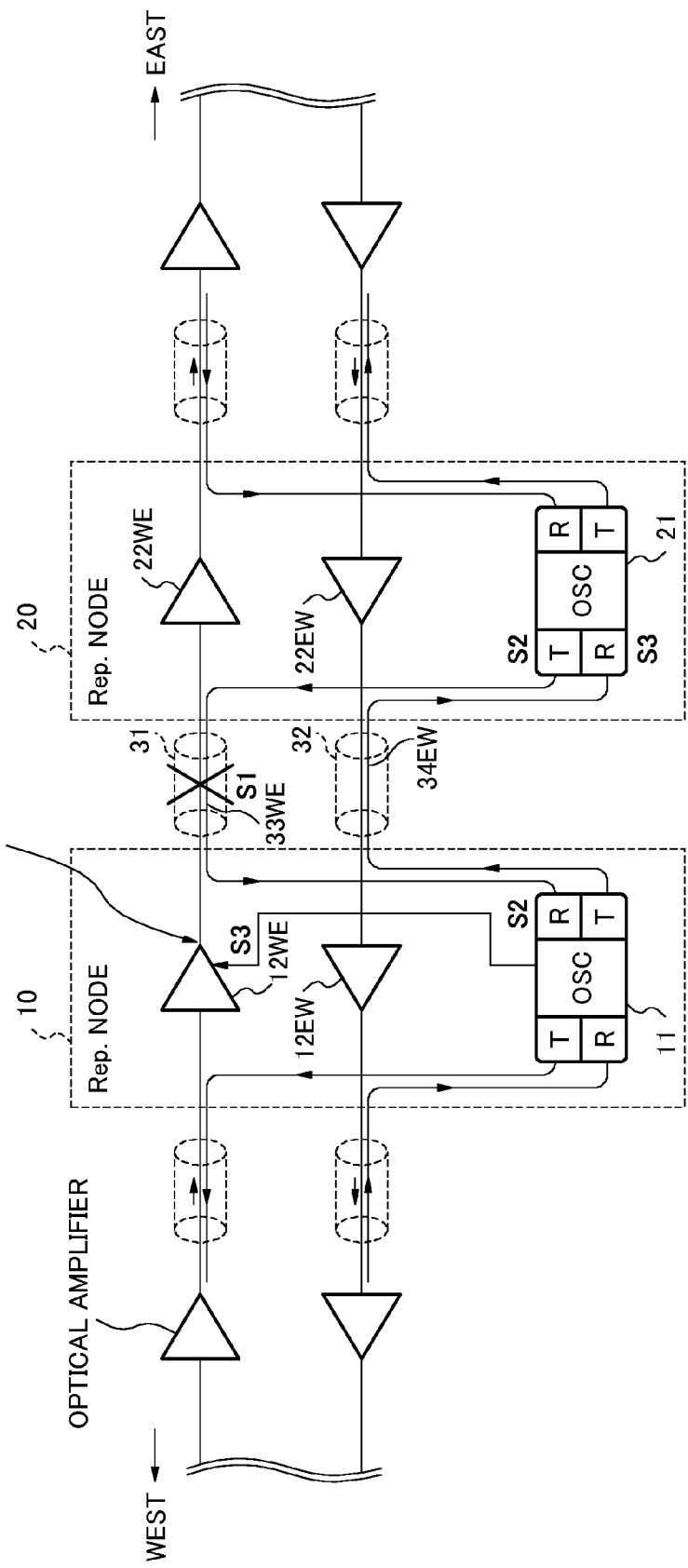

OPTICAL FIBER TRANSMISSION SYSTEM AND POWER CONTROL METHOD OF THE SAME

This application is based upon and claims the benefit of priority from Japanese Patent Application No. 2011-048051, filed on Mar. 4, 2011, the disclosure of which is incorporated herein in its entirety by reference.

TECHNICAL FIELD

The present invention relates to an optical fiber transmission system and its power control method. More particularly, the present invention relates to a technology which reduces optical output automatically (APR (Automatic Power Reduction) function) as a safety measure against disconnection of a connector or a cut of a cable in an optical fiber transmission system.

BACKGROUND ART

<OSC Communication Function>

In a network including a plurality of nodes, communication between devices constituting each node is performed through an OSC line. OSC is an abbreviation of Optical Supervisory Channel. OSC is also called SV (supervisory) or Telemetry. Especially in a wavelength-multiplexed communication system, an OSC line is often realized using a wavelength different from that of a main signal. Each node has a function block (it is called such as a Circuit Pack, Package, Panel, unit, plug-in module) which sends and receives an OSC signal. This is called an "OSC package" in this specification for convenience. There is also a case where an OSC package unites with a management function block (system controller) of a node. Meanwhile, a "main signal" used in this document is a signal on which information that a transmission network has undertook its transmission from a client. On the other hand, an OSC signal is a signal for communication between devices within a transmission network.

An OSC package of each node is connected with its adjacent node via an OSC line, and they are always communicating with each other. Because a signal is received certainly by each node, a communication message between nodes away from each other is relayed and transmitted via OSC packages of intermediate nodes.

<The APR Function of ITU-T Recommendation G.664>

An optical transmission device and an optical transmission system are required to conform to the laser safety standard (IEC (International Electrotechnical Commission) 60825-2). In a wavelength-multiplexed optical communication system including optical amplification repeater nodes that is used widely today, it is required to prevent a laser beam of high power from being emitted from a portion that has been disconnected. For this reason, it is common that such wavelength-multiplexed optical communication system possesses an APR (Automatic Power Reduction) function recommended in ITU-T recommendation G.664, version 3 (March, 2006).

<A First APR Function Realization Method Related to the Present Application>

Function implementation of APR described in ITU-T (International Telecommunication Union Telecommunication Standardization Sector) recommendation G.664 will be explained using FIG. 5.

In FIG. 5 and in FIGS. 1, 3, 4 and 7 that will be described separately, description will be made in detail only about nodes on both sides of a section where a transmission line break occurs. Illustration of nodes besides those will be omitted or simplified. It is general that each optical amplifier includes in its input portion a monitor which detects existence or non-existence of an input signal. In FIG. 5 and FIGS. 1, 3, 4 and 7, only input signal monitors related to a described operation are illustrated, and illustration of monitors besides these are omitted. In a transmission line, it is general that a main signal occupying the majority of optical power and a signal of an optical monitoring line (hereinafter, referred to as "OSC (Optical Supervisory Channel) line") are multiplexed to be transmitted. Also it is general that a multiplexer or a demultiplexer for this purpose is provided at an entrance and exit of a node to a transmission line. However, in FIG. 5 and FIGS. 1, 3, 4 and 7, illustration of these is omitted for simplification of description. In FIG. 5, the most general case in which a main signal and an OSC signal are transmitted in a same direction is described.

The first APR function realization method related to the present application is performed by a procedure of the following Steps S1 to S5. Meanwhile, Steps S1-S5 correspond to S1-S5 indicated in FIG. 5.

Step S1: A Cut occurs in a transmission line 31.

Step S2: A node 20 which is situated in the downstream side of a cut position detects that reception of both of a main signal from an optical amplifier 12WE and an OSC signal 33WE have stopped.

Step S3: The node 20 performs the following two operations toward a node 10 which is located in the upstream side of the cut position.

(1) To stop main signal output of an optical amplifier 22EW to a transmission line 32 which is the opposite transmission line of the cut line.

(2) To transmit an APR operating command for stopping main signal output of the optical amplifier 12WE performing output toward the cut position through an OSC line 34EW heading to the node 10.

Step S4: The node 10 detects that the main signal from the optical amplifier 22EW of the node 20 has stopped. Also, the node 10 receives the APR operating command through the OSC line 34EW.

Step S5: Upon detection of stopping of a main signal from the node 20 and reception of the APR operating command, the node 10 stops main signal output of the optical amplifier 12WE toward the cut position.

FIG. 6 is a diagram illustrating a situation after activation of APR by the first APR function realization method related to the present application. When the above described APR operation is activated by the node 10 and the node 20, influence shown in FIG. 6 occurs to nodes besides these.

In FIG. 6, first, output of a main signal toward the cutting occurrence section is stopped by APR control. The main signal to the cutting occurrence section is indicated by an outline arrow in FIG. 6. As it has been described with reference to FIG. 5, when an input main signal disappears (Loss of main signal), each optical amplifier stops output. Therefore, in the downstream side of the section where the signal disconnection has occurred, a shutdown by loss of an input main signal is chained. Thus, when an APR operation by the first APR realization method related to the present application is activated, transmission of a main signal is disrupted in both directions at the section in which APR has occurred.

Supplementary explanation of the operation of APR control mentioned above will be made.

As a cause of communication disruption of a main signal of the optical amplifier 12WE and the OSC signal 33WE, various causes such as a package failure and a wrong removal of internal wiring of a device besides cutting of a transmission line are also conceivable. For this reason, in Step S2, disruption of reception of both of a main signal and the OSC signal 33WE of the optical amplifier 12WE is made be a condition of activation of the APR operation.

When any of a main signal of the optical amplifier 12WE or the OSC signal 33WE is being transmitted, because it is certain that a transmission line is not cut, transmission in the upstream side does not need to be suspended. In other words, making stoppage of reception of both a main signal of the optical amplifier 12WE and the OSC signal 33WE be a condition of APR activation is an idea to avoid misjudgment that there is a transmission line break though a transmission line is normal. When it is not a transmission line break, it goes without saying that the maintenance workability is good if the APR operation is not performed.

There are two reasons for that, in Step S3, when activation of the APR operation is notified to the node 10 located in the upstream side of the cut position, main signal output of the optical amplifier 22EW is also stopped in addition to notifying it through the OSC line 34EW. Both of the reasons described below are caused by a matter that, although there is a possibility the transmission line 32 is also cut together with the transmission line 31, the node 20 cannot make confirmation about this.

One reason is that, because there is a possibility that the transmission line 32 is cut, it is necessary to stop output giving priority to safety even if it is not cut. The other reason is that, when the transmission line 32 has been also cut, although there is a possibility that the APR operating command for stopping main signal output of the optical amplifier 12WE has not been transmitted to the node 10 through the OSC line 34EW, there is no method to confirm that.

The reason that the APR operating command is notified through the OSC line 34EW is for prevention of false detection of an APR operation activation condition. In other words, in order for the node 10 to determine to activate an APR operation and stop main signal output to an APR activation section, the following two conditions have to be satisfied. The first condition is that a main signal from the node 20 is cut, and the second condition is that the OSC signal 34EW from the node 20 is cut or an APR operating command included in the OSC signal 34EW is received. By this duplication, true APR occurrence can be detected certainly while preventing the node 10 from wrongly detecting APR at the time of a failure, replacement and the like of the optical amplifier 22EW and an OSC package 21 of the node 20.

As shown in FIG. 6, in typical implementation of APR, a main signal in the transmission line 32 side that has a possibility not being cut is also cut. However, of course, there are some users who do not desire this. In other words, there is a desire to, when at least a line of one direction is alive, keep it alive.

<The Second APR Realization Method Related to the Present Application>

The second APR realization method related to the present application does not stop communication in the opposite side of a cut transmission line.

In the Appendix of ITU-T recommendation G.664, an APR operation which can stop a signal in the upstream side without making an impact on a main signal in the transmission line 32 side that has a possibility not being cut is described. FIG. 7 shows this method. When compared with FIG. 5, there is a feature that an OSC signal is transmitted to an opposite direction relative to a main signal. The APR operation will be described in turn.

Step S1: Cutting occurs to the transmission line 31.

Step S2: The node 10 that is located in the upstream side of the cut position detects that reception of an OSC signal 33EW from the node 20 situated in the downstream side of the cut position has stopped.

Step S3: By the stoppage of an OSC signal 33EW, the node 10 stops main signal output of the optical amplifier 12WE toward the cut position.

According to the second APR realization method related to the present invention, an APR operation can be performed for each one-way transmission line to which cutting has occurred. In other words, an APR operation can be performed without having an influence on a signal which passes the transmission line 32, the transmission line 32 being of an opposite direction of the transmission line 31 to which cutting has occurred and having a possibility not being cut.

Meanwhile, in U.S. Pat. No. 7,260,324, there is description about a signal transmitted in an opposite direction of a main signal in a 2-fiber Bi-directional optical transmission system (column 8, line 43 etc.). However, there is no detailed description about the signal in the specification.

SUMMARY

An exemplary object of the present invention is to provide, in a structure in which two neighboring nodes are connected by two transmission lines where main signals are transmitted in directions different from each other, an optical transmission system and a power control method of the same capable of maintaining, when only a transmission line in one direction is cut, transmission of a main signal of the other transmission line without wrongly detecting a transmission line break.

An optical fiber transmission system according to an exemplary aspect of the invention includes a first node and a second node neighboring with each other, wherein the first node comprises a first optical amplifier which outputs a signal to a first transmission line for transmitting a signal from the first node to the second node, and a first monitoring control unit, wherein the second node includes a monitor which monitors arrival of a signal from the first transmission line, a second optical amplifier which outputs a signal to a second transmission line for transmitting a signal from the second node to the first node, and a second monitoring control unit, wherein upon detection of signal disconnection from the first transmission line by the monitor, the second monitoring control unit transmits a power reduction notification for making output power of the first optical amplifier reduced to the first monitoring control unit, wherein upon receipt of the power reduction notification, the first monitoring control unit reduces power of the first optical amplifier, and transmits a completion notification as a notification representing completion of power reduction of the first optical amplifier to the second monitoring control unit, and wherein upon not receiving the completion notification even after expiration of an allowed time set in advance, the second monitoring control unit reduces signal power of the second optical amplifier.

A power control method according to an exemplary aspect of the invention is for an optical fiber transmission system including a first node and a second node neighboring with each other, wherein the first node comprises a first optical amplifier which outputs a signal to a first transmission line for transmitting a signal from the first node to the second node, and a first monitoring control unit, and wherein the second node comprises a monitor which monitors arrival of a signal from the first transmission line, a second optical amplifier which outputs a signal to a second transmission line for transmitting a signal from the second node to the first node, and a second monitoring control unit. The method includes detecting signal disconnection from the first transmission line in the monitor, transmitting a power reduction notification for making output power of the first optical amplifier reduced to the first monitoring control unit from the second monitoring control unit, reducing power of the first optical amplifier upon receipt of the power reduction notification in the first monitoring control unit, transmitting a completion notification as a notification representing completion of power reduction of the first optical amplifier from the first monitoring control unit to the second monitoring control unit and reducing signal power of the second optical amplifier by the second monitoring control unit upon not receiving the completion notification even after expiration of an allowed time set in advance.

A node apparatus according to an exemplary aspect of the invention includes an optical amplifier which outputs a signal to a neighboring node and a monitoring control unit which, upon receipt of a notification instructing reduction of transmission power of the optical amplifier from the neighboring node, reduces power of the optical amplifier, and notifies the neighboring node of completion of power reduction of the optical amplifier.

The present invention makes it possible that, in a structure in which two neighboring nodes are connected by two transmission lines where main signals are transmitted in directions different from each other, when only a transmission line in one direction is cut, transmission of a main signal of the other transmission line is maintained without wrongly detecting a transmission line break.

BRIEF DESCRIPTION OF THE DRAWINGS

Exemplary features and advantages of the present invention will become apparent from the following detailed description when taken with the accompanying drawings in which:

FIG. 1 is a diagram showing a structure of an optical transmission system of a first exemplary embodiment;

FIG. 3 is a diagram showing a structure of an optical transmission system of a second exemplary embodiment;

FIG. 4 is a diagram showing a structure of an optical transmission system of a third exemplary embodiment;

FIG. 5 is an operation explanatory drawing of a first APR realization method related to the present application;

FIG. 6 is a situation explanatory drawing after APR activation in the first APR realization method related to the present application;

FIG. 7 is an operation explanatory drawing of a second APR realization method related to the present application.

EXEMPLARY EMBODIMENT

Figure 2C:
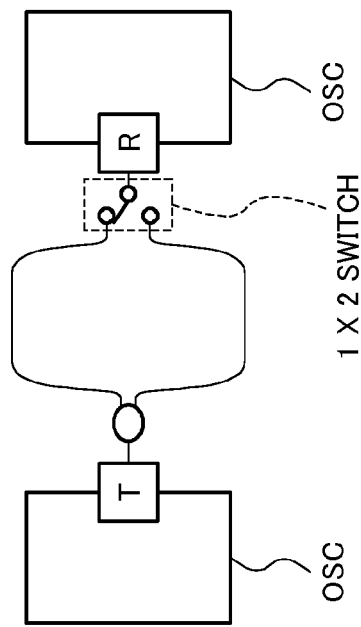
FIG. 2A, FIG. 2B and FIG. 2C are explanatory drawings of a modification of the first exemplary embodiment.

Hereinafter, exemplary embodiments of the present invention will be described with reference to drawings.

Each exemplary embodiment described later operates by a procedure described in the following <Basic operation> basically. As a result, each exemplary embodiment does not wrongly detect a transmission line break, and maintains its output when a transmission line opposite the transmission line that has been cut has not been cut. By this, an APR function that improves the usability is provided.

<Basic Operation>

In the first procedure, the downstream station of a section in which a cut has occurred sends an order to stop output of the upstream station of the section to the upstream station. Main signal output in the opposite side is maintained at this stage.

In the second procedure, the upstream station notifies the downstream station that the output has been stopped based on the order via any transmission route.

In the third procedure, the downstream station waits for a notification of output stop completion from the upstream station for an allowed time period. When receiving the notification, the downstream station keeps maintaining output of the opposite side. When not receiving the notification even if the allowed time period has passed, the downstream station stops output of the opposite side.

Meanwhile, in a node which participates in APR, existence or non-existence of a transmitter and existence or non-existence of a receiver of a main signal are unrelated to description of APR. Accordingly, in order to simplify description, in the following exemplary embodiments, an exemplary embodiment of an APR operation between Repeater nodes (Rep. Node) will be described. Also, illustration of a transmitter and a receiver of a main signal which exist in some of nodes in the network (Terminal node, OADM node or the like) is omitted. Meanwhile, OADM is an abbreviation of "optical add drop multiplexer".

<The First Exemplary Embodiment>

A structure of an optical transmission system of the first exemplary embodiment is shown in FIG. 1. According to this exemplary embodiment, an OSC line is duplicated. Each optical amplifier generally includes in its input portion a monitor for detecting existence or non-existence of an input signal. In FIG. 1, only input signal monitors related to an APR operation are illustrated, and illustration is omitted about monitors besides these.

The structure shown in FIG. 5 includes one system of transmission unit and one system of reception unit of an OSC signal. In contrast, the structure of this exemplary embodiment includes two systems of transmission units and two systems of reception units of an OSC signal. Same information is transmitted through both of the transmission line 31 and the transmission line 32. By this duplication, when only a transmission line in any one side is cut, two-way communication of an OSC signal is possible through the other transmission line.

The basis of an operation is as it has been described in <Basic action>. The operation of the first exemplary embodiment is described more in detail as follows.

Step S1: Cutting occurs to the transmission line 31.

Step S2: The node 20 located in the downstream side of the cut position detects stop of reception of both of a main signal and an OSC signal 33WE_1 received by an optical amplifier 22WE. The node 20 detects that reception of OSC signal 33WE_2 is continuing.

Step S3: The node 20 transmits an APR operating command for stopping main signal output of the optical amplifier 12WE being outputted toward the cut position to the node 10 situated in the upstream side of the cut position through an OSC line 34EW_2 that goes through the transmission line 32.

Step S4: The node 10 receives the APR operating command through OSC line 34EW_2 going through the transmission line 32.

Step S5: The node 10 stops main signal output of the optical amplifier 12WE toward the cut position. Next, the node 10 notifies to the node 20 that "the main signal output of the optical amplifier 12WE toward the cut position has been stopped based on the APR command" through an OSC line 33WE_2 that goes through the transmission line 32.

Step S6: If the main signal output suspension notification of the optical amplifier 12WE of the node 10 is received within an allowed time period, the node 20 completes the operation. The allowed time period is a predetermined time period set in advance during which radiation can be permitted from a viewpoint of laser safety. An exemplary allowed time period is about 3 seconds or less.

Step S7: When the node 20 cannot receive the main signal output suspension notification of the optical amplifier 12WE of the node 10 within the allowed time, main signal output of the optical amplifier 22EW to the transmission line 32 is stopped.

When both of them are cut almost simultaneously, the transmission lines 31 and 32 operate as mentioned below.

In Step S2, the node 20 detects that three signals of a main signal received by the optical amplifier 22WE and the OSC signals 33WE_1 and 33WE_2 sent from the node 10 have stopped. As a result, the node 20 stops main signal output of the optical amplifier 22EW.

The operation of the node 10 is the same as that of the node 20 described above. That is, the node 10 detects three signals of a main signal received by an optical amplifier 12EW and OSC signals 34EW_1 and 34EW_2 sent from the node 20 have stopped. As a result, the node 10 stops main signal output of the optical amplifier 12WE.

In the technology related to the present application described above, when a main signal and an OSC signal stop simultaneously, a node in which reception of an OSC signal has been stopped suspends main signal output of an optical amplifier to the relevant section immediately. According to the present exemplary embodiment, when one of two OSC signals which the node 10 is transmitting can be received continuously by the node 20, for example, the transmission line of an OSC signal which can be received is supposed that it is "alive". Then, the node 20 withholds stoppage of a main signal temporarily, and, for the node 10, tries control to stop main signal output to the cut transmission line. When the node 20 receives a notification saying that the control has completed from the node 10, it can be determined that confirmation that the transmission line supposed to be "living" a short while ago is really "living" has been made. Accordingly, in this case, the node 20 can keep transmitting a main signal continuously. When confirmation that the transmission line supposed to be "living" is really "living" has not been made within an allowed time, the node 20 suspends transmission of a main signal because there is a risk that light is being radiated from the transmission line.

Thus, when only the transmission line 31 in one direction is cut, an optical transmission system of the first exemplary embodiment can maintain transmission of a main signal of the other transmission line 32 without causing wrong detection of a transmission line break.

According to this exemplary embodiment, bidirectional OSC signals need to be transmitted through one fiber. Supplementary explanation of a method for this will be made. Separation of OSC signals is possible even by utilizing a difference in the directions of the OSC signals. However, because there is a case where light reflection and having an identical frequency is formed by influence of such as Rayleigh scattering, OSC signals may not be able to be separated sufficiently when the difference in directions of movement of an OSC signal is used. In order to avoid this, wavelength multiplexing and demultiplexing of OSC signals may be performed using a different wavelength for each direction of the OSC signal. For example, in FIG. 1, it may be such that different wavelengths may be used between the OSC signals 33WE_2 and 34EW_2, and different wavelengths may be used between the OSC signals 33WE_1 and 34EW_1. However here, it goes without saying that the wavelengths of 33WE_1 and 33WE_2 may be identical and the wavelengths of 34EW_1 and 34EW_2 may be identical. That is, 33WE_1, 33WE_2 and 34 EW_1, 34EW_2 may be branched after being outputted from identical transmitters, respectively. This will be mentioned later with reference to FIG. 2B and FIG. 2C.

The main body of Steps S2, S3, S6 and S7 among each of the above-mentioned steps is, more specifically, an optical monitoring means (OSC package) 21 provided in the node 20 in the downstream side of the cut position. The main body of Steps S4 and S5 is an optical monitoring means (OSC package) 11 provided in the node 10 in the upstream side of the cut position.

<Modification of the First Exemplary Embodiment>

The first exemplary embodiment mentioned above may be modified as follows.

In the first exemplary embodiment, it is a basic structure that two transmission units and two reception units of an OSC signal are prepared. The following is considered as a modification example to simplify this portion. It will be described with reference to FIGS. 2A-2C.

Figure 2A:
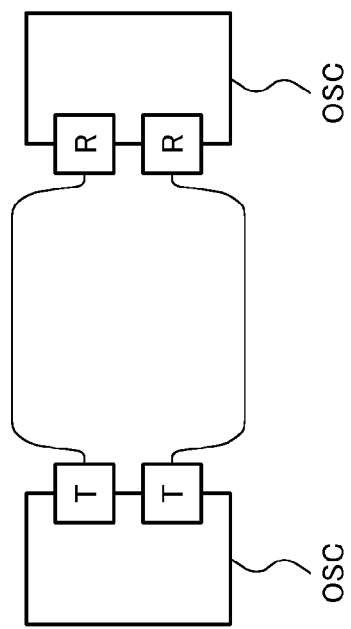

FIG. 2A indicates the structure before modifying the transmission units and the reception units of an OSC signal, in other words, a structure equal to the first exemplary embodiment mentioned above. Meanwhile, in FIGS. 2A-2C, a transmitter and a receiver of an OSC signal are indicated by T and R. Also, in FIGS. 2A-2C, only a line in one direction among bidirectional OSC lines is illustrated. The other components are omitted because they are identical with those of FIG. 1 and the like.

Figure 2B:
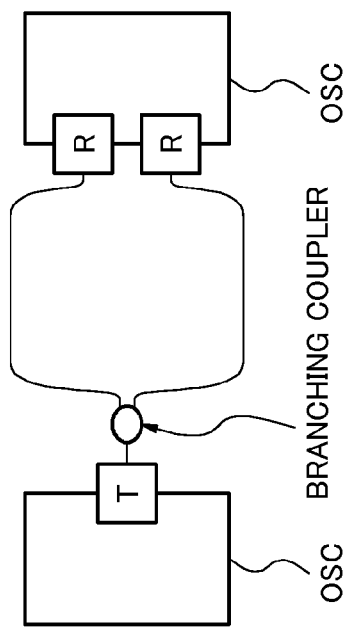

As a modification example of the first exemplary embodiment, there is a structure in which output of one transmission unit is splitted instead of preparing two transmission units, as shown in FIG. 2B. When an identical OSC signal is transmitted to different transmission lines, this structure is effective.

As another modification example of the first exemplary embodiment, there is a structure in which a transmission line of a connection is switched by a 1×2 optical switch instead of preparing two reception units, as shown in FIG. 2C.

The structure shown in FIG. 2C has the effect of cost reduction when a reception unit is more expensive than a 1×2 optical switch. In FIG. 2C, only the state of either one of OSC signals can be detected at one time. Accordingly, in the structure shown in FIG. 2C, when reception of an OSC signal being monitored stops, the receiver switches the optical switch to the transmission line of the other OSC signal. After confirming whether reception of the other OSC signal is possible or not, the receiver performs a next operation. That is, in the structure of FIG. 2C, the receiver is used in a time divided manner.

When there is an anxiety about delay of control caused by using a receiver in a time divided manner, it may be of a structure to always monitor presence of two systems of OSC signals using cheap optical receivers which can detect only existence or non-existence of an OSC signal. The reason is that, for realization of APR control, it is not necessary to receive all information carried by an OSC signal.

Also, it is possible to combine a technical idea of switching transmission lines of a connection by a 1×2 optical switch instead of preparing two reception units with a technical idea of splitting output of one transmission unit instead of preparing two transmission units.

Meanwhile, an optical fiber transmission system of the following structure including first and second nodes neighboring with each other also produces the same effect as the first exemplary embodiment.

Specifically, the optical fiber transmission system includes: a first optical amplifier that outputs a signal to a first transmission line transmitting a signal from the first node to the second node; and a first monitoring control unit. The second node includes: a monitor that monitors arrival of a signal from the first transmission line; a second optical amplifier that outputs a signal to a second transmission line transmitting a signal from the second node to the first node; and a second monitoring control unit.

When the monitor provided in the second node detects signal disconnection from the first transmission line, the second monitoring control unit of the second node transmits a power reduction notification for reducing the output power of the first optical amplifier to the first monitoring control unit.

When the power reduction notification is received from the second node, the first monitoring control unit of the first node reduces output power of the first optical amplifier of the first node. Then, a completion notification representing that reduction of output power of the first optical amplifier has been completed is transmitted to the second monitoring control unit.

When a completion notification is not received from the first node even after an allowed time set in advance has been expired, the second monitoring control unit of the second node reduces signal output of the second optical amplifier of the second node.

<The Second Exemplary Embodiment>

FIG. 3 indicates a structure of the second exemplary embodiment. The second exemplary embodiment is a structure in which a notification that main signal output has been stopped is made by a ring structure. Although the second exemplary embodiment is approximately the same structure as FIG. 5, a transmission line has a ring structure. Operation of the second exemplary embodiment will be described in turn.

Step S1: Cutting occurs to the transmission line 31.

Step S2: The node 20 located in the downstream side of the cut position detects reception of both of a main signal and the OSC signal 33WE received by the optical amplifier 22WE have stopped.

Step S3: The node 20 transmits an APR operating command to stop main signal output of the optical amplifier 12WE that outputs toward the cut position to the node 10 situated in the upstream side of the cut position through the OSC line 34EW that goes through the transmission line 32.

Step S4: The node 10 receives an APR operating command through the OSC line 34EW that goes through the transmission line 32.

Step S5: The node 10 stops main signal output of the optical amplifier 12WE toward the cut position. Next, it is notified to the node 20 through an OSC line (OSC line 35) in a route different from the transmission line 31 having a possibility of a transmission line break that "the main signal output of the optical amplifier 12WE toward the cut position has been stopped based on the APR command."

Meanwhile, "an OSC line in a route different from the transmission line 31 with a possibility of the transmission line break" in Step S5 is, in a case where a network is constituted like a ring shape just like this exemplary embodiment, the OSC line 35 that goes through sections except for the section between the node 10 and the node 20 having a possibility that a transmission line break has occurred. The OSC line 35 is drawn just like a dedicated line in FIG. 3 for convenience. However, as it has been described in the section of technology related to the present application, the OSC line 35 is transmitted like a bucket relay by an OSC package of each node.

Step S6: When an optical amplifier 12WE main signal output suspension notification of the node 10 is received within an allowed time, the node 20 finishes operating. The allowed time is a predetermined time set in advance within which radiation can be permitted from a laser safety viewpoint. The exemplary allowed time is about 3 seconds or less.

Step S7: When the node 20 cannot receive the optical amplifier 12WE main signal output suspension notification of the node 10 within the allowed time, the node 20 stops main signal output of the optical amplifier 22EW toward the transmission line 32.

When both of the transmission lines 31 and 32 are cut almost simultaneously, the operation will be as follows.

The node 20 cannot transmit an APR control signal to the node 10, and cannot receive an APR operation completion signal from the node 10 within the predetermined time. As a result, the node 20 stops main signal output of the optical amplifier 22EW.

The operation of the node 10 described above is the same as that of the node 20. That is, when detecting that a main signal which the optical amplifier 12EW receives and the OSC signal 34EW sent from the node 20 have stopped together, the node 10 transmits an APR control signal to the node 20. However, because an APR operation completion signal from the node 20 cannot be received within a predetermined time, the node 10 stops main signal output of the optical amplifier 12WE.

In the technology related to the present application, when a main signal and an OSC signal have stopped simultaneously, a node for which reception of an OSC signal has stopped suspends main signal output of an optical amplifier to the relevant section immediately. According to this exemplary embodiment, a transmission line opposite the transmission line which is considered to have been cut is assumed as "alive". Then, the node 20 withholds stoppage of a main signal temporarily, and, for the node 10, tries control to stop main signal output to the cut transmission line through the transmission line assumed as "living". When the node 20 receives a notification saying that the control has completed from the node 10, it is determined that confirmation that the transmission line supposed to be "alive" a short while ago is really "living" has been made. In this case, the node 20 can keep transmitting a main signal continuously. When confirmation that the transmission line supposed to be "living" is really "living" has not been made within an allowed time, the node 20 suspends transmission of a main signal because there is a risk that light is being radiated from the transmission line.

Thus, when only the transmission line 31 in one direction is cut, an optical transmission system of the second exemplary embodiment can maintain transmission of a main signal of the other transmission line 32 without causing wrong detection of a transmission line break.

It is, more specifically, the optical monitoring means (OSC package) 21 of the node 20 that performs Steps S2, S3, S6 and S7. It is an optical monitoring means (OSC package) 11 of the node 10 that performs Steps S4 and S5.

<Modification of the Second Exemplary Embodiment>

In the second exemplary embodiment shown in FIG. 3, the node 10 may transmit the notification that "main signal output to the cut position has been stopped based on the APR command" in both of the clockwise direction and the counter-clockwise direction of transmission lines constituting a ring. The node 20 may receive the notification transmitted from the node 10 from either route by a receiver.

In this exemplary embodiment, a "ring structure" that is the simplest structure is taken as an example of a network configuration between the nodes. However, because a network of a mesh structure can also be regarded as an aggregation of networks of a ring structure, the structure of this exemplary embodiment can be applied to most of a general network.

<The Third Exemplary Embodiment>

A structure of the third exemplary embodiment is shown in FIG. 4. According to this exemplary embodiment, a notification that main signal output has been stopped is made by a route besides the main signal transmission line. The structure of the third exemplary embodiment is similar to the structure shown in FIG. 5 for the most part, but the third exemplary embodiment has a feature that it includes DCN (Data Communication Network).

DCN is a network for a user of a device to manage the device. As lines for communication with a device from a distance, there are a route using OSC and a route using DCN. A device is generally made such that it can operate normally when at least an OSC line is connected. In other words, daily communication between devices is generally performed via an OSC line. The main use of DCN is connection between a device and a server, called NMS (Network Management System), which manages the device and the whole network. Accordingly, DCN is also called MCN (Management Communication Network). A device can be managed through a line that goes through OSC. However, it is general to provide DCN independently with an OSC line in order to make possible management of a device even when an OSC signal is interrupted.

DCN is a general-purpose network for a user that is used in a manner making various devices mixed, and a band which can be used in DCN is not guaranteed. When DCN is congested, a reduction of a transfer rate and a delay occur. In contrast, an OSC line is a line dedicated only to a mounted device. Accordingly, device-specific control communication and the like which is needed always is designed such that a guaranteed band in the OSC line is used.

APR control is control inside a device, and it is desirable that its content is transmitted by the OSC line. However, at the time when transmission line break occurs, restrictions occur to OSC communication because at least part of the OSC line is cut. Accordingly, it is conceivable that the restrictions of OSC communication will be supplemented by DCN.

Operation of the third exemplary embodiment will be described in turn using FIG. 4.

Step S1: Cutting occurs to the transmission line 31.

Step S2: The node 20 located in the downstream side of the cut position detects reception of both of a main signal and the OSC signal 33WE received by the optical amplifier 22WE have stopped.

Step S3: The node 20 transmits an APR operating command to stop main signal output of the optical amplifier 12WE that is performing output toward the cut position to the node 10 situated in the upstream side of the cut position through the OSC line 34EW that goes through the transmission line 32.

Step S4: The node 10 receives an APR operating command through the OSC line 34EW that goes through the transmission line 32.

Step S5: The node 10 stops main signal output of the optical amplifier 12WE toward the cut position. Next, the node 10 notifies the node 20 through DCN that "the main signal output of the optical amplifier 12WE toward the cut position has been stopped based on the APR command."

Step S6: When an optical amplifier 12WE main signal output suspension notification of the node 10 is received within an allowed time, the node 20 finishes operating. The allowed time is a predetermined time set in advance within which radiation can be permitted from a laser safety viewpoint. The exemplary allowed time is about 3 seconds or less.

Step S7: When the node 20 has not received the optical amplifier 12WE main signal output suspension notification of the node 10 within the allowed time, main signal output of the optical amplifier 22EW toward the transmission line 32 is stopped.

Thus, when only the transmission line 31 in one direction is cut, an optical transmission system of the third exemplary embodiment can maintain transmission of a main signal of the other transmission line 32 without causing wrong detection of a transmission line break.

It is, more specifically, the optical monitoring means (OSC package) 21 of the node 20 that performs Steps S2, S3, S6 and S7. It is an optical monitoring means (OSC package) 11 of the node 10 that performs Steps S4 and S5.

<Modification of the Third Exemplary Embodiment>

In the description of the third exemplary embodiment mentioned above, DCN has been adopted. However, DCN in the third exemplary embodiment is employed as a route besides the main signal transmission line, and thus DCN may be changed by another route having an equivalent function.

In Steps S3 and S4, the node 20 notifies the node 10 of an APR command through the OSC line 34EW that goes through the transmission line 32. However, the OSC line 34EW may also be made go through DCN. The reason that it is preferred to use an OSC line is that, there is a possibility that, compared with communication via an OSC line, communication via DCN takes time and is unstable as described above. Because an OCS line 32EW is a dedicated line for communicating from the node 20 to the node 10, a communication time is short and transmission can be made certainly. Because emission of a high-power laser beam from a cut position is a matter of safety, it is desirable to transmit a control signal as soon as possible and certainly.

In the first to third exemplary embodiments described above, description has been made using an example of a 2-fiber bidirectional transmission system. However, it goes without saying that, even in a transmission system with the larger number of used cores such as a system using four cores of working systems and standby systems, for example, the technical idea of the present application can be applied.

In the above mentioned exemplary embodiments, for description simplification, reducing an optical output level to a power level that a laser safety standard specifies as safe is explained as optical output is stopped or suspended. When saying it in detail, it includes a case where optical output is reduced to the level at which it is permitted to keep performing free radiation. Here, needless to say, an OSC signal is also included in the judgment objects of safety of an optical output level.

In description of each of the above mentioned exemplary embodiments, description has been made supposing that all light transmitted through a transmission line besides an OSC signal is a main signal that is output of an optical amplifier for description simplification. However, it goes without saying that, even to a case where light that is not an OSC signal and also not a main signal outputted from an optical amplifier such as excitation light for distributed Raman amplification, for example, is transmitted to a transmission line, the technical idea of the present application can be applied if its transmission power can be controlled.

Meanwhile, according to each of the exemplary embodiments, it is notified to a node in the downstream side of a cut transmission line that power reduction of an optical amplifier which outputs a signal to a transmission line being clearly cut has been completed. On the other hand, in APR technology described in ITU-T recommendation G.664, for example, there is description that a signal corresponding to an APR cancellation request for automatically cancelling a power reduction measure after restoration of transmission line cut and automatically initiating communication is kept being transmitted to the cut transmission line even after power reduction of an optical amplifier has completed. Because the notification that power reduction of an optical amplifier has been completed described in each of the exemplary embodiments and the APR cancellation request described in ITU-T recommendation G.664 are completely different from each other, confusion of them should be avoided. Meanwhile, needless to say, the technical idea of the present application can coexist with the mechanism of an automatic communication recovery that is described in ITU-T recommendation G.664.

In addition, there is also known an APR technology that is applied, in a structure in which distributed Raman amplification is used together in a transmission line in addition to a discrete optical amplifier, when excitation light is inputted in the reverse direction of a main signal, in particular. Even in such structure, by applying a structure which has been also described in each of the exemplary embodiments, the same effect as each of the exemplary embodiments can be obtained.

<The Fourth Exemplary Embodiment>

The fourth exemplary embodiment of the present invention is a power automatic reduction control method at the time of cutting of a transmission line equipped in each node in an optical fiber transmission system, wherein: when focusing on a certain transmission section sandwiched by two nodes, and calling these as a node A and a node B temporarily, the neighboring two nodes are connected by a first transmission line that transmits a signal from the node A to the node B and a second transmission line which transmits a signal from the node B to the node A; the node A comprises an optical amplifier A1 which performs signal output toward the first transmission line and a monitoring control means AC; the node B comprises a monitor B1 that monitors a signal arrival from the first transmission line, an optical amplifier B2 which performs signal output toward the second transmission line, and a monitoring control means BC; when a transmission line break occurs to the first transmission line, the monitor B1 of the node B detects the transmission line break; the monitoring control means BC transmits an instruction to reduce output power of the optical amplifier A1 of the node A outputting a signal to the first transmission line that has been cut to a safe level to the monitoring control means AC of the node A; and the monitoring control means AC of the node A receives the power reduction notification from the node B, and reduces power of the optical amplifier A1, the power automatic reduction control method at the time of a transmission line cut, comprising: the monitoring control means AC of the node A notifying the monitoring control means BC of the node B of a completion notification which is a notification representing that reduction in power of the optical amplifier A1 has been completed according to the power reduction notification from the node B; and the monitoring control means BC of the node B waiting for reception of a completion notification of signal power reduction for an allowed time set in advance, and reducing signal power of the optical amplifier B2 outputted to the second transmission line automatically, upon not receiving a completion notification after expiration of the allowed time.

<The Fifth Exemplary Embodiment>

The fifth exemplary embodiment of the present invention is a power automatic reduction control method, wherein: when focusing on a certain transmission section sandwiched by two nodes in an optical fiber transmission system, and calling these as a node A and a node B temporarily, the node A and the node B are connected by a first transmission line that transmits a signal from the node A to the node B and a second transmission line which transmits a signal from the node B to the node A; the node A comprises an optical amplifier A1 which performs signal output toward the first transmission line and a monitoring control means AC; and the node B comprises a monitor B1 that monitors a signal arrival from the first transmission line, an optical amplifier B2 which performs signal output toward the second transmission line, and a monitoring control means BC, said method comprising: a first step of detecting by the monitor B1 a possibility of occurrence of a transmission line break in the first transmission line; a second step of transmitting by the monitoring control means BC a power reduction notification which is an instruction to reduce output power of the optical amplifier A1 outputting a signal toward the first transmission line to a safe level to the monitoring control means AC; a third step of receiving by the monitoring control means AC the power reduction notification, and reducing power of the optical amplifier A1; a fourth step of notifying, by the monitoring control means AC, the monitoring control means BC of a completion notification which is a notification representing that reduction in power of the optical amplifier A1 has been completed by the third step; and a fifth step of waiting for, by the monitoring control means BC, reception of a completion notification for an allowed time set in advance, and reducing signal power of the optical amplifier B2 being outputted to the second transmission line, upon not receiving a completion notification even after expiration of the allowed time.

<The Effect of Each Exemplary Embodiment>

The effect of each of the exemplary embodiments mentioned above will be described.

According to each of the exemplary embodiment mentioned above, when an APR operation is performed, when a line in the transmission line 32 side having a possibility not being cut is alive actually, it is possible to keep the line alive. As a result, it can be prevented that influence of one transmission line break expands to a main signal disconnection of the other transmission line.

When the node 20 cannot receive a stop completion notification within a certain period of time after the node 20 has sent a stop signal of output (APR signal) to the node 10, there is a possibility that the APR signal has not reached the node 10 situated in the upstream side of the cut position because the transmission line 32 has been also cut. In this case, the node 20 suspends transmission of a main signal toward the node 10. By this, it can be prevented that a laser beam beyond a permissible limit is kept being emitted at a cut position.

In addition, a condition of APR operation activation may not always be a cut of just one of a main signal and an OSC signal. For example, by making it an activation condition of APR that no smaller than two phenomena from which cutting is assumed are observed, a wrong judgment of a transmission line break can be prevented even when any one of a main signal and an OSC signal is cut due to a failure and the like.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The whole or part of the exemplary embodiments disclosed above can be described as, but not limited to, the following supplementary notes.

(Supplementary Note 1) An optical fiber transmission system comprising a first node and a second node neighboring with each other, wherein said first node comprises a first optical amplifier which outputs a signal to a first transmission line for transmitting a signal from said first node to said second node, and a first monitoring control unit, wherein said second node comprises a monitor which monitors arrival of a signal from said first transmission line, a second optical amplifier which outputs a signal to a second transmission line for transmitting a signal from said second node to said first node, and a second monitoring control unit, wherein upon detection of signal disconnection from said first transmission line by said monitor, said second monitoring control unit transmits a power reduction notification for making output power of said first optical amplifier reduced to said first monitoring control unit, wherein upon receipt of said power reduction notification, said first monitoring control unit reduces power of said first optical amplifier, and transmits a completion notification as a notification representing completion of power reduction of said first optical amplifier to said second monitoring control unit, and wherein upon not receiving said completion notification even after expiration of an allowed time set in advance, said second monitoring control unit reduces signal power of said second optical amplifier.

(Supplementary Note 2) The optical fiber transmission system according to Supplementary note 1, wherein said second monitoring control unit receives said completion notification through a line going through said second transmission line.

(Supplementary Note 3) The optical fiber transmission system according to Supplementary note 1, wherein said first node and said second node are connected by a plurality of transmission lines in a ring-shaped manner, and wherein said second monitoring control unit receives said completion notification through a line going through a transmission line not including said first and second transmission lines.

(Supplementary Note 4) The optical fiber transmission system according to Supplementary note 1, wherein said second monitoring control unit receives said completion notification via a data communication network connecting said first node and said second node so that they can communicate with each other.

(Supplementary Note 5) A power control method of an optical fiber transmission system including a first node and a second node neighboring with each other, wherein said first node comprises a first optical amplifier which outputs a signal to a first transmission line for transmitting a signal from said first node to said second node, and a first monitoring control unit, and wherein said second node comprises a monitor which monitors arrival of a signal from said first transmission line, a second optical amplifier which outputs a signal to a second transmission line for transmitting a signal from said second node to said first node, and a second monitoring control unit; said method comprising:

detecting signal disconnection from said first transmission line in said monitor;

transmitting a power reduction notification for making output power of said first optical amplifier reduced to said first monitoring control unit from said second monitoring control unit;

reducing power of said first optical amplifier upon receipt of said power reduction notification in said first monitoring control unit;

transmitting a completion notification as a notification representing completion of power reduction of said first optical amplifier from said first monitoring control unit to said second monitoring control unit; and reducing signal power of said second optical amplifier by said second monitoring control unit upon not receiving said completion notification even after expiration of an allowed time set in advance.

(Supplementary Note 6) A node apparatus, comprising:
an optical amplifier which outputs a signal to a neighboring node; and a monitoring control unit which, upon receipt of a notification instructing reduction of transmission power of said optical amplifier from said neighboring node, reduces power of said optical amplifier, and notifies said neighboring node of completion of power reduction of said optical amplifier.

(Supplementary Note 7) A node apparatus, comprising:
a monitor which monitors arrival of a signal from a neighboring node;

an optical amplifier which outputs a signal to said neighboring node; and a monitoring control unit which instructs reduction of power of a signal being monitored by said monitor to said neighboring node upon detection of a cut of said monitored signal from said neighboring node, and reduces power of said optical amplifier, upon not receiving a notification of completion of execution of said instruction from said adjacent node even after an allowed time determined in advance.

The invention claimed is:

1. An optical fiber transmission system comprising a first node and a second node neighboring with each other,
   wherein said first node comprises a first optical amplifier which outputs a signal to a first transmission line for transmitting a signal from said first node to said second node, and a first monitoring control unit,
   wherein said second node comprises a monitor which monitors arrival of a signal from said first transmission line, a second optical amplifier which outputs a signal to a second transmission line for transmitting a signal from said second node to said first node, and a second monitoring control unit,
   wherein upon detection of signal disconnection from said first transmission line by said monitor, said second monitoring control unit transmits a power reduction notification for making output power of said first optical amplifier reduced to said first monitoring control unit,
   wherein upon receipt of said power reduction notification, said first monitoring control unit reduces power of said first optical amplifier, and transmits a completion notification as a notification representing completion of power reduction of said first optical amplifier to said second monitoring control unit, and
   wherein upon not receiving said completion notification even after expiration of an allowed time set in advance, said second monitoring control unit reduces signal power of said second optical amplifier.

2. The optical fiber transmission system according to claim 1, wherein said second monitoring control unit receives said completion notification through a line going through said second transmission line.

3. The optical fiber transmission system according to claim 1, wherein
   said first node and said second node are connected by a plurality of transmission lines in a ring-shaped manner, and wherein
   said second monitoring control unit receives said completion notification through a line going through a transmission line not including said first and second transmission lines.

4. The optical fiber transmission system according to claim 1, wherein said second monitoring control unit receives said completion notification via a data communication network connecting said first node and said second node so that they can communicate with each other.

5. A power control method of an optical fiber transmission system including a first node and a second node neighboring with each other, wherein said first node comprises a first optical amplifier which outputs a signal to a first transmission line for transmitting a signal from said first node to said second node, and a first monitoring control unit, and wherein said second node comprises a monitor which monitors arrival of a signal from said first transmission line, a second optical amplifier which outputs a signal to a second transmission line for transmitting a signal from said second node to said first node, and a second monitoring control unit; said method comprising:

detecting signal disconnection from said first transmission line in said monitor;

transmitting a power reduction notification for making output power of said first optical amplifier reduced to said first monitoring control unit from said second monitoring control unit;

reducing power of said first optical amplifier upon receipt of said power reduction notification in said first monitoring control unit;

transmitting a completion notification as a notification representing completion of power reduction of said first optical amplifier from said first monitoring control unit to said second monitoring control unit; and reducing signal power of said second optical amplifier by said second monitoring control unit upon not receiving said completion notification even after expiration of an allowed time set in advance.

6. A node apparatus, comprising:

an optical amplifier which outputs a signal to a neighboring node; and a monitoring control unit which, upon receipt of a notification instructing reduction of transmission power of said optical amplifier from said neighboring node, reduces power of said optical amplifier, and notifies said neighboring node of completion of power reduction of said optical amplifier via a different path from a path that transmits said signal outputted by said optical amplifier to said neighboring node.

7. A node apparatus, comprising:

a monitor which monitors arrival of a signal from a neighboring node;

an optical amplifier which outputs a signal to said neighboring node; and a monitoring control unit which instructs reduction of power of a signal being monitored by said monitor to said neighboring node upon detection of a cut of said monitored signal from said neighboring node, and reduces power of said optical amplifier, upon not receiving a notification of completion of execution of said instruction from said adjacent node even after an allowed time determined in advance.

* * * * *